(12) United States Patent
Foucher et al.

(10) Patent No.: US 10,841,370 B2
(45) Date of Patent: Nov. 17, 2020

(54) METHOD AND SYSTEM FOR FAILOVER OF A DATA PORTION OF A COLLABORATION CONFERENCE IN A COLLABORATION CONFERENCE SYSTEM

(71) Applicant: Level 3 Communications, LLC, Broomfield, CO (US)

(72) Inventors: Craig Foucher, Lincoln Park, MI (US); Raja Bhattacharjee, Broomfield, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 197 days.

(21) Appl. No.: 15/954,035

(22) Filed: Apr. 16, 2018

(65) Prior Publication Data
US 2018/0309825 A1 Oct. 25, 2018

Related U.S. Application Data

(60) Provisional application No. 62/487,275, filed on Apr. 19, 2017.

(51) Int. Cl.
| | | |
|---|---|---|
| *H04L 29/08* | (2006.01) | |
| *H04L 29/06* | (2006.01) | |
| *H04M 3/56* | (2006.01) | |
| *H04L 29/12* | (2006.01) | |
| *H04M 3/22* | (2006.01) | |

(52) U.S. Cl.
CPC ...... *H04L 67/1034* (2013.01); *H04L 65/1083* (2013.01); *H04L 65/1089* (2013.01); *H04L 65/403* (2013.01); *H04L 65/4015* (2013.01); *H04L 67/02* (2013.01); *H04M 3/567* (2013.01); *H04L 61/1511* (2013.01); *H04M 3/22* (2013.01)

(58) Field of Classification Search
CPC . H04L 67/1034; H04L 67/02; H04L 65/1083; H04L 65/1089; H04L 65/403; H04L 65/4015; H04L 61/1511; H04M 3/567; H04M 3/22
See application file for complete search history.

(56) References Cited

U.S. PATENT DOCUMENTS

| | | | | |
|---|---|---|---|---|
| 2008/0059487 | A1* | 3/2008 | Mi | G06F 16/2246 |
| 2012/0159234 | A1* | 6/2012 | Mehta | H04L 41/0663 |
| | | | | 714/4.11 |
| 2017/0353544 | A1* | 12/2017 | Lala | H04L 67/1036 |

* cited by examiner

*Primary Examiner* — Soe Hlaing

(57) ABSTRACT

Aspects of the present disclosure involve systems, methods, computer program products, and the like, for providing a failover system and method for one or more collaboration conference web adapters. In general, the system and method allow for the movement of traffic or other communication packets associated with a collaboration conference from one adapter located in a first data center to another adapter located in a second data center. In one embodiment, the failover may occur in response to the detection or determination of a failure or loss of an operational state at an adapter of the system. In another embodiment, the failover may occur in response to a selection from an operations center to move the traffic to the selected adapter or second data center.

7 Claims, 6 Drawing Sheets

METHOD AND SYSTEM FOR FAILOVER OF A DATA PORTION OF A COLLABORATION CONFERENCE IN A COLLABORATION CONFERENCE SYSTEM

CROSS-REFERENCE TO RELATED APPLICATIONS

This application is related to and claims priority under 35 U.S.C. § 119(e) from U.S. Patent Application No. 62/487,275, filed Apr. 19, 2017, titled "METHOD AND SYSTEM FOR FAILOVER OF A DATA PORTION OF A COLLABORATION CONFERENCE IN A COLLABORATION CONFERENCE SYSTEM," the entire content of which is incorporated herein by reference for all purposes.

TECHNICAL FIELD

Aspects of the present disclosure generally relate to systems and methods that provide for collaboration conferencing with multiple participants using devices connected to a telecommunication network, including a VoIP network, and more specifically for a failover procedure for one or more web adapters of the network utilized during a collaboration conference.

BACKGROUND

Telecommunication networks provide for the transmission of information across a distance through terrestrial, wireless or satellite communication networks. Such communications may involve voice, data or multimedia information, among others. In addition, telecommunication networks may offer features and/or services to the customers of the network that provide flexible and varied ways in which users of the network may connect and the communications are transmitted over the network. For example, some telecommunication networks provide a conferencing feature that allows several users of the network to communicate at once in a single connection, rather than a simple person-to-person communication. The number of participants to a conference communication may range from a few users to several hundred users communicating on the same telephonic and/or data call. Typically, to access a tele-conference, participants to the conference use a telephonic device (or other communication device) to dial a dedicated conferencing telephone number. Once a participant is connected to the conferencing system through the communication device, the system may request additional information from the participants, such as a conference call access code or other type of conference identifying information entered through the keypad of the telephonic device through which they are connected. The conferencing number and access code are then utilized by the telecommunications network to connect that participant to a particular conferencing bridge device that the conferencing system reserves for the conference. In still other embodiments, once the participants are connected to the conferencing bridge, a request for a second identification code may be transmitted that identifies a particular participant as a chairperson for the conference. A chairperson to the collaboration conference may have certain additional features for the conference, such as the ability to mute participants, disconnect participants, or to control aspects of an associated web conference. Once the participants are connected to the conference bridge and/or identified as a chairperson, the multiple-party conference may occur as hosted on the conference bridge.

SUMMARY

One implementation of the present disclosure may take the form of a method for operating a telecommunications network. The method may include the operation of associating a first web adapter device of a first data center and a second web adapter device of a second data center with a collaboration conferencing bridge of a telecommunications network, each of the first web adapter and the second web adapter configured to receive a communication associated with a data portion of a collaboration conference comprising the data portion and an audio portion hosted on the collaboration conferencing bridge, wherein the first data center is different than the second data center. Further, the method may include the operations of receiving an indication of an initiation of a failover procedure at a first load balancer of the first data center, transmitting one or more status requests to the second web adapter device of the second data center, receiving an operating status indicator from the second web adapter device of the second data center in response to the one or more status requests, and redirecting an additional communication associated with the data portion of the collaboration conference hosted on the collaboration conferencing bridge to the second web adapter of the second data center.

Another implementation of the present disclosure may take the form of a system for operating a collaboration conferencing system, the system comprising a communication port transmitting configuration instructions to a first load balancer of a first data center and a second load balancer of a second data center, wherein the first data center is different than the second data center, a processing device, and a computer-readable medium connected to the processing device configured to store information and instructions. When the processing device executes the information and instructions, the processing device transmits an initiation of a failover procedure to the first load balancer of the first data center, the failover procedure to transfer communications associated with a data portion of a collaboration conference comprising the data portion and an audio portion hosted on the collaboration conferencing bridge of a telecommunications network from a first web adapter device of the first data center to a second web adapter device of the second data center. The processing device further transmits one or more status requests to the first web adapter device of the first data center and the second web adapter device of the second data center, activates the second web adapter device of the second data center in response to the one or more status requests, deactivates the first web adapter device of the first data center in response to the one or more status requests, and broadcasts a secondary Internet Protocol (IP) address associated with the second load balancer of the second data center to a Domain Name Server (DNS) in response to the initiation of the failover procedure.

Yet another implementation of the present disclosure may take the form of a telecommunications network. The network may include a first data center comprising a first load balancer and a first web adapter, the first web adapter configured to receive a communication associated with a data portion of a collaboration conference comprising the data portion and an audio portion hosted on a collaboration conferencing bridge and transmit the communication to the collaboration conferencing bridge, a second data center comprising a second load balancer and a second web adapter associated with the collaboration conferencing bridge, the first data center geographically separate from the second data center, and computing device in communication with the first data center and the second data center. The computing device may transmit an initiation of a failover procedure to the first load balancer of the first data center, the failover procedure to transfer communications associated with the data portion of the collaboration conference from the first web adapter of the first data center to the second web adapter of the second data center, transmit one or more status requests to the first web adapter of the first data center and the second web adapter of the second data center, and activate the second web adapter of the second data center in response to the one or more status requests. In response, the computing device may deactivate the first web adapter of the first data center and broadcast a secondary Internet Protocol (IP) address associated with the second load balancer of the second data center to a Domain Name Server (DNS) in response to the initiation of the failover procedure.

DETAILED DESCRIPTION

Figure 1A:
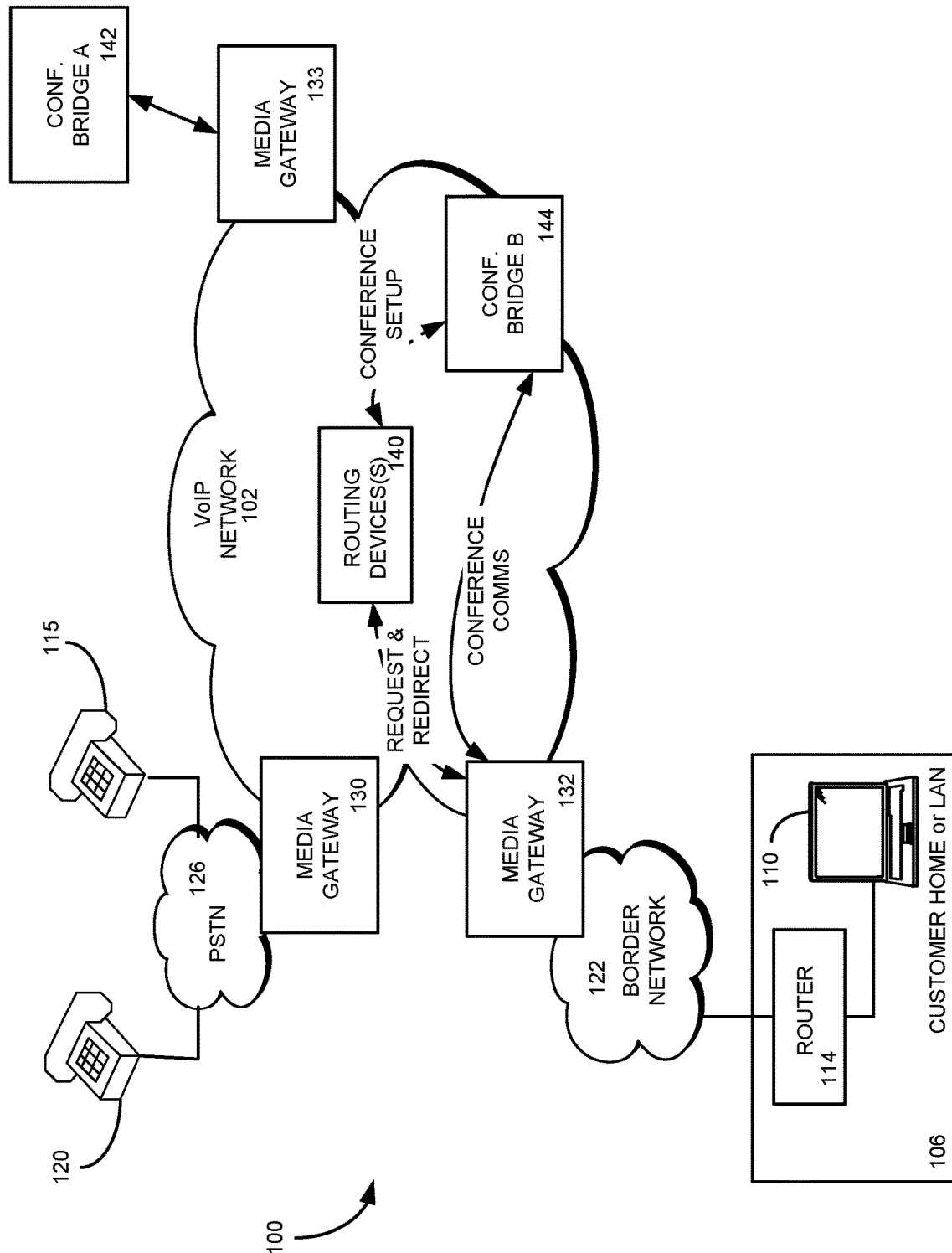
FIG. 1A schematic diagram illustrating an exemplary Voice over Internet Protocol (VoIP) operating environment for providing collaboration conferencing services to a user of the environment.

Collaboration conferences hosted on a telecommunications network may allow several devices connected to the network to communicate at once in a single connection, rather than through multiple device-to-device communications. In addition to providing for the multiple users of the conference to communicate at once through an audio portion, many collaboration conferences also allow for additional collaboration over a web or data portion. In such a conference, a user or participant to the conference may access the data portion through a computing device (such as a participant's desktop or laptop computer) and the audio portion either through the computing device or through a separate communication device (such as a mobile phone or desk phone). The two portions may be associated or combined by the telecommunications network, or more particularly the collaboration conferencing system, to provide the entire conference to the participants of the conference. In some instances, the telecommunications network through which the conference is accessible may combine the data portion and the audio portion into a single available conference through one or more adapters between telecommunication networks and/or the participant's devices. This allows for the various components of the collaboration conferencing system to communicate and work together to provide a combined audio/data conference.

Further, during a collaboration conference, it may be desirable for various reasons to utilize different components of the conferencing system to provide the collaboration service to the participants. For example, one or more of the adapters utilized to combine the audio and data portions of the conference may go offline or otherwise become unavailable due to an outage within a data center of the network. In another example, a network administrator may elect to utilize different adapters within the network due to business or operations reasons. The use of a system or network component after a collaboration conference is previously established on the system is referred to herein as a "failover" from a first device to a second device. Failover from one device or component to another in the network or collaboration conferencing system may occur for any reason.

Aspects of the present disclosure involve systems, methods, computer program products, and the like, for providing a failover feature for one or more collaboration conference adapters in a telecommunications network. In general, the systems and/or methods allow for the redirection of traffic or other communication packets associated with a collaboration conference from one adapter or similar device located in a first data center to another adapter located in a second data center. In one particular embodiment, the failover may occur in response to the detection or determination of a failure or loss of an operational state at an adapter of the system. In another embodiment, the failover may occur in response to a selection from an operations center or administrator of the collaboration conference to move the traffic to the selected adapter or second data center. The failover from one data center to the second data center may allow a collaboration conference with shared data and audio portions to continue to be supported on a participant's computing device through a power loss or other compromise in the transmission of the collaboration conference packets.

Beginning with FIG. 1A, an exemplary operating environment 100 for hosting conference collaboration communications between multiple participants is shown. In general, the environment 100 provides for establishing communication sessions between network users or devices connected to a network 102. In a particular implementation, the devices connected to the network 102 may join or otherwise participate in a collaboration conference to exchange communications and/or data between multiple parties over a single communication session. As shown in FIG. 1A, the environment 100 includes a VoIP network 102, which may be in some instances provided by a wholesale network service provider. However, while the environment 100 is illustrated as utilizing the VoIP network 102, it should be appreciated that portions of the network 102 may any type of telecommunication routing, including non IP-based routing. For example, network 102 may include devices utilizing time division multiplexing (TDM) or plain old telephone service (POTS) switching. In general, the network 102 of FIG. 1A may include any communication network devices known or hereafter developed.

The VoIP network 102 includes any number of telecommunication devices to transmit, route, process, or otherwise facilitate the exchange of communication packets between the devices of the network. Such devices may include, but are not limited to, gateways, routers, and registrars which enable communication between communication devices across the VoIP network 102. Such network components or devices are not shown or described in detail here as those skilled in the art will readily understand the operation of the components. More relevant to this description is the interaction and communication between customer devices connected to the network 102, such as the one or more customer home or business local area networks (LANs) 106, and one or more conferencing bridges 142, 144 for participation a collaboration conference hosted by the network.

In general, customer network 106 can include communication devices such as, but not limited to, a personal computer or a telephone 110 connected to a router/firewall 114. Although shown in FIG. 1A as computer 110, the communication devices connected to the network 102 may include any type of communication device that receives a multimedia signal, such as an audio, video or web-based signal, and presents that signal for use by a user of the communication device. The communication and networking components of the customer network 106 enable a user at the customer network to communicate via the VoIP network 102 to other communication devices also connected to the network, such as another customer network and/or an analog telephone 115, 120. Components of the customer network 106 are typically home- or business-based, but they can be relocated and may be designed for easy portability. For example, the communication device 110 may be wireless (e.g., cellular) telephone, smart phone, tablet or portable laptop computer.

The customer network 106 typically connects to the VoIP network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the communication device 120 accesses, and is accessed by, the VoIP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the VoIP Network 102 through a media gateway device (130, 132). For ease of instruction, only three communication devices 110, 115, 120 are shown communicating with the VoIP network 102; however, numerous such devices, and other devices, may be connected with the network, which is equipped to handle enormous numbers of simultaneous calls and other communications.

Some telecommunications networks provide a collaboration conferencing feature to one or more of its customers. In general, a request to establish a collaboration conference over the VoIP network 102 is initiated by a requester through one of the communication devices 110, 115, 120 associated with the network. As used herein, the term "collaboration conference" includes any type of collaboration between three or more users connected to a communication network. For example, the collaboration conference may include audio collaboration, video collaboration, web collaboration, a combination of any of the above, and the like. In general, although FIG. 1A illustrates some of the communication devices 115, 120 as telephonic devices, the communication devices may be any type of communication device, including personal computers, laptops, cellular phones, and the like.

Upon receipt of the request for a collaboration conference, the connected media gateway 132 routes the request to a routing device 140 or routing devices integrated within the network 102. However, it should be appreciated that the routing device 140 may be a part of the network 102, may be separate from the network, or may have portions deployed in the network and out of the network. In addition, the routing device 140 may be resident on one or more components of the VoIP network 102, including several instances of the routing device integrated throughout the network. Further, although only a single instance of a routing device 140 is illustrated in FIG. 1A, any number of routing devices may be present in the network 102 to aid in the transmission of collaboration conferencing requests to one or more conferencing bridges 144 of the network or connected to the network.

To transmit the request to the network, the requester uses a communication device (either computer 110 or telephone 115, 120) to enter a conference specific telephone number or conference access number. Although discussed herein as receiving requests to initiate a collaboration conference, the routing device 140 may also receive requests from a communication device to join an existing conference. In response to the receiving the request to join or initiate the conference, and described in more detail below, the routing device 140 routes the one or more requests to one of several conference bridges 142, 144 associated with the VoIP network 102 for hosting of the collaboration conference. Although only two conference bridges 142, 144 are shown in FIG. 1A, it should be appreciated that any number of conference bridges may be associated with the network 102 (either included in or connected to the network) for hosting collaboration conferences. In some embodiments, the routing device 140 utilizes the telephone number included with the request to determine or select which conferencing bridge for the requested collaboration conference.

In general, the conference bridges 142, 144 provide a hosting site for a collaboration conference between a plurality of users of the network 102. Thus, conference bridge A 142 may host a collaboration conference while conference bridge B 144 may host an additional but separate collaboration conference. In particular, conference bridge A 142 is connected to the communications network 102 through a media gateway 133 similar to the media gateways disclosed above. This configuration may be utilized when the conference bridge 142 is a time division multiplex (TDM) bridge. Alternatively, conference bridge B 144 is internal to the VoIP network 102 such that the conference bridge may be utilized for Internet Protocol (IP) based bridges and is generally described in more detail below.

To connect to a collaboration conference, each participant to the conference may be routed to the same conference bridge 144 selected by the network 102 for hosting the conference. The selected conference bridge 144, in turn, provides communication ports to each participant such that each participant can hear or otherwise participate in the collaboration conference through the respective communication devices connected to the network 102. Any conference bridge known in the art or hereafter developed may be integrated into the system 100 of FIG. 1A for hosting a collaboration conference, including IP-based conference bridges. In addition, the term "conference bridge" or "bridge" includes any component of a communication network that provides an access point to one or more users of the network for a collaboration conference. For example, "conference bridge" may also include such devices as a media server device, a gateway server device or the like as configured within the network 102.

In some instances, the conference bridge 144 or routing device 140, upon receipt of the request to initiate or join a collaboration conference, executes an application that queries the requester to enter an access code number that the requester enters into a keypad or other input device of the communication device 110, 115, 120. With this information, the network 102 determines that the requester intends to initiate or join a particular collaboration conference and routes the request to the selected conference bridge for that conference, as explained in greater detail below. In this manner, each participant to the collaboration conference may provide the same access code to the routing device 140 to be routed to the same bridge to attend the collaboration conference. The routing device 140 may then determine which conferencing bridge to utilize (based on the provided telephone number or conference identifier) and connect the requesting communication device to the selected conferencing bridge. Further, in some networks, the conferencing bridge 144 may request additional information from a requester for a conference to identify a status of the participant. For example, the conferencing bridge 144 may allow for a conference to have a chairperson (or other type of participant status). A chairperson may be given additional conferencing features that other participants do not have, such as the ability to mute participants, disconnect participants, share certain features with other participants, and the like. A participant may identify themselves as the conference chairperson in a similar manner as described above. In particular, the chairperson may provide the information (such as a unique chairperson code) to the bridge 142, 144 through a keypad or other input device of the user's communication device 110, 115, 120 to identify the participant as the chairperson. Upon receipt of the identifying information, such as a chairperson code, the collaboration bridge gives that particular user the chairperson features.

Figure 1B:
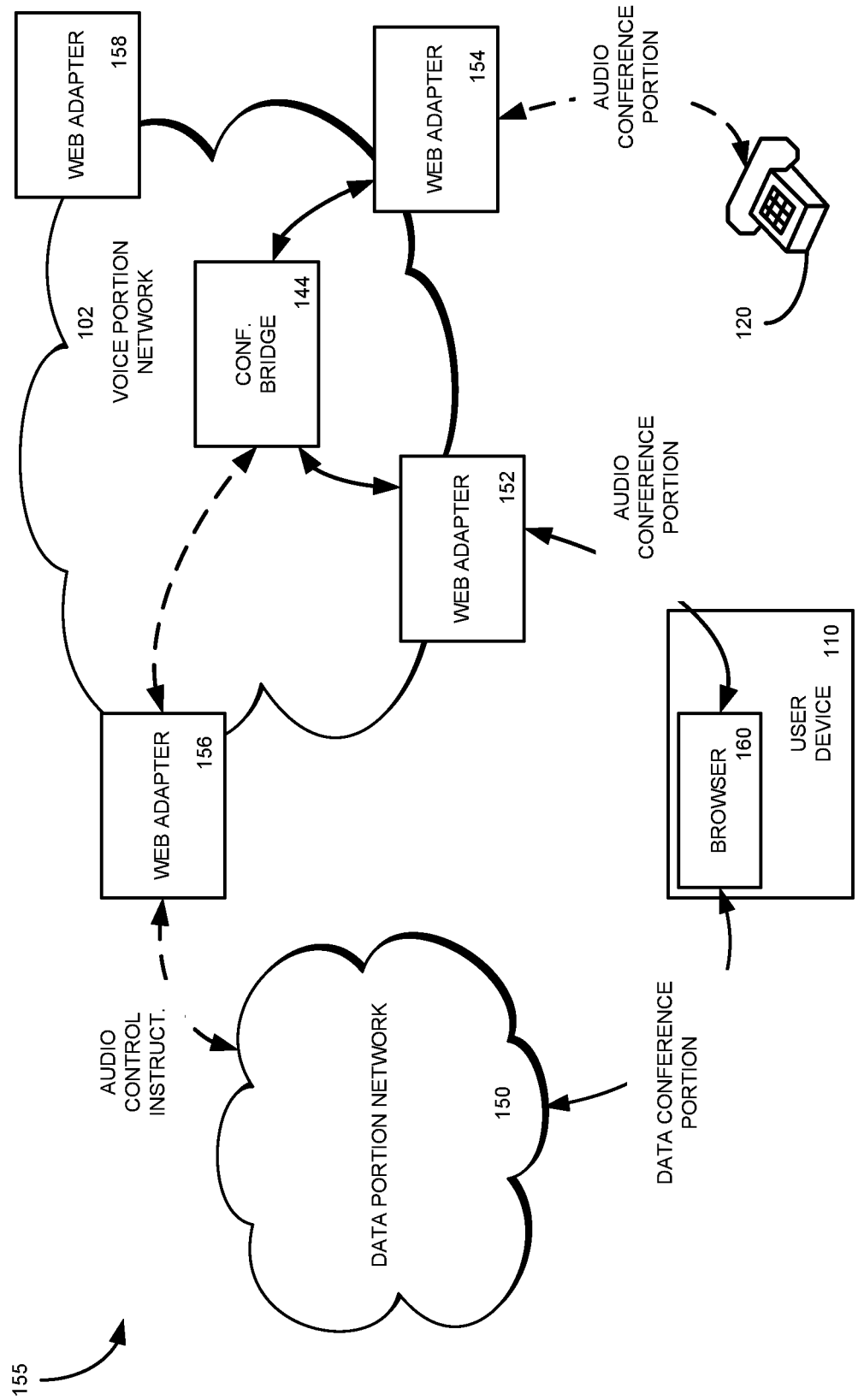
FIG. 1B is a schematic diagram illustrating a collaboration conferencing system utilizing a first telecommunications network for a data portion of a conference and a second telecommunications network for a voice portion of the conference.

As mentioned above, the collaboration conference may include both a data portion (such as a video portion for the sharing of video between the participants or a web-based portion for sharing of documents or other data files) and an audio portion. Further, in some instances, the separate portions of the collaboration conference are hosted by separate telecommunication networks such that some synchronization between the portions is utilized to provide a single conference to the participants. FIG. 1B illustrates a collaboration conferencing system 155 utilizing a first telecommunications network 150 for a data portion of a conference and a second telecommunications network 102 for a voice portion of the conference. Many of the components of system 155 of FIG. 1B are the same as that illustrated in FIG. 1A. For example, a user computing device 110 may access a telecommunications network 102 to participate in a collaboration conference hosted on a conferencing bridge 144. However, in the example shown in FIG. 1B, a voice or audio portion of the collaboration conference is hosted by the network 102 while a second telecommunications network (network 150) provides the data portion of the collaboration conference. Also illustrated is a plurality of adapters 152 through which a user's device 110 may communicate with the network 102 to combine the audio and data portions of the collaboration conference. As explained in more detail below, the adapters 152 provide control over the audio portions of the collaboration conference to a user of the computing device 110.

In the particular collaboration conference illustrated, a data portion is hosted on a data network 150. The data network 150 may be any type of telecommunications network or other network in which packets of data are exchanged between devices connected to or included in the network. In the example shown, a participant to a collaboration conference may utilize the computing device 110 to access the data portion network 150 to begin receiving the data portion in connection with a collaboration conference. In one implementation, the computing device 110 may execute a web browser program 160 that a user of the device may enter a Uniform Resource Locator (URL) or Internet Protocol (IP) address associated with a collaboration conference. The web browser 160 of the computing device 110 provides the URL or IP address to the network 150 to request and receive data from a device within or connected to the network located at the URL or IP address. Once connected to the data network 150, the data portion of the collaboration conference may be presented on a display of the user computing device, in some cases through the same web browser program. This data, in one example, may form the data portion of the collaboration conference. Further, other participants of a collaboration conference may also obtain the same data portion of the collaboration conference by accessing the network 150 in a similar manner. In particular, the other participants may utilize their own computing devices executing a web browser program to receive the URL or IP address for the data portion and present the data portion to the conference participants on a display.

In addition, the collaboration conference may include an audio portion hosted by a voice network 102 that is separate from the data portion network 150. Participants to the collaboration conference may, in addition to collaborating with the data portion over the data portion network 150, access the audio portion of the conference hosted on the conferencing bridge 144 of IP network 102. To access the audio portion, a participant may use a communication device to dial into or otherwise access the bridge 144 as described above. In one example, the participant may utilize the computing device 110 as a communication device to access the audio portion. In another example, the participant may utilize a first computing device 110 for accessing the data portion of the conference and a separate second communication device (such as a telephone) to access the audio portion. In some instances, participants of the conference may utilize the audio portion to discuss the data, documents, files, etc. displayed on the participant's computing device as included in the data portion of the conference. In this manner, both portions of the collaboration conference, the data or document portion and the audio portion, are presented to the collaboration participants.

As discussed above, many conferencing programs provide the ability to control certain aspects of the audio portion through a participant's communication device 110. In some particular instances, the participant may control aspects of the audio portion through the computing device 110 through which the participant is viewing the data portion of the conference. For example, a chairperson of a conference may mute certain participants, disconnect certain participants, or select certain participants to speak through a conference interface provided on the chairperson's computing device 110. In such a set-up, communications between the computing device 110 and the audio-portion conferencing bridge 144 are passed to coordinate the inputs received from the participant to execute the inputs. For example, an instruction to mute a participant may be generated by the computing device 110 in response to an input provided by a participant to the conference and transmitted to the audio conferencing bridge 144 for execution to mute the selected participant in the conferencing bridge.

It should be appreciated that the communication to control aspects of the audio portion may come from the user's computing device 110 as shown in FIG. 1B, or may come from the data network 150 in response to an instruction transmitted to the network from the computing device. For example, in some instances the user's computing device 110 connects to both the data portion network 150 and the conferencing bridge 144 for the audio portion of the conference. In this implementation, the input or command to mute a participant may be transmitted from the user's device 110 to the conferencing bridge 144. In other instances, however, the chairperson connects to the audio portion of the conferencing bridge 144 through a telephonic device and to the data portion through a separate computing device 110. In this example, the user's input to mute a participant through the user's computing device 100 may be received at the data portion network 150 connected to the user's computing device and transmitted to the conferencing bridge 144 from the data network. Thus, the data portion network 150 may also connect to the conferencing bridge 144 to coordinate inputs received through the data portion of the conference with the audio portion. In some implementations, the data portion network 150 (or more particularly, the device or devices within the data portion network 150 providing the data portion of the conference) may access the conferencing bridge 144 in a similar manner as the participants to the conference.

Regardless of whether the chairperson instruction is received at the network 102 from the user's computing device 110 or the data portion network 150, the network may utilize one or more web adapters 152 at the edge of the voice network 102 to receive the instruction and transmit the instruction to the conferencing bridge 144. In other words, one or more web adapters 152-158 are located or established on the logical edge of the network 102 to provide a communication conduit between a device through which the data portion of the conference is accessible and the audio conferencing bridge 144. The web adapter 152-158 may coordinate a communications of a data portion with an audio portion of a collaboration conference hosted on a conferencing bridge 144. Through the adapter 152, control over certain aspects of the audio portion of the collaboration conference (such as muting, disconnecting, etc.) is provided to users of the conferencing program by receiving, translating, and transmitting communications from a computing device associated with one or more participants to the conference.

In one embodiment of the telecommunications network 102, web adapters 152-158 may be located in different data centers of the network. For example, a first data center that houses some components of the network 102, including a first set of web adapters utilized for collaboration conferencing, may be located in Denver, Colo. A second data center that houses other components, including a second set of web adapters, may be located in Atlanta, Ga. The various data centers provide a larger geographic footprint for the network 102 to provide more capacity and faster service to the customers of the network. In addition, the various data centers allow for redundancy of components and services within the network such that the network may respond to an outage at a component or data center site. For example, the second data center may include similar components as the first data center of the network 102 such that the second data center may perform a failover function to the services provided by the first data center. In other words, a network administrator or operator may respond to an outage at the first data center by redirecting the communications and packets to the second data center until the outage at the first data center is rectified. This may include providing a failover service for collaboration conferences that utilize components in the first data center.

Figure 2:
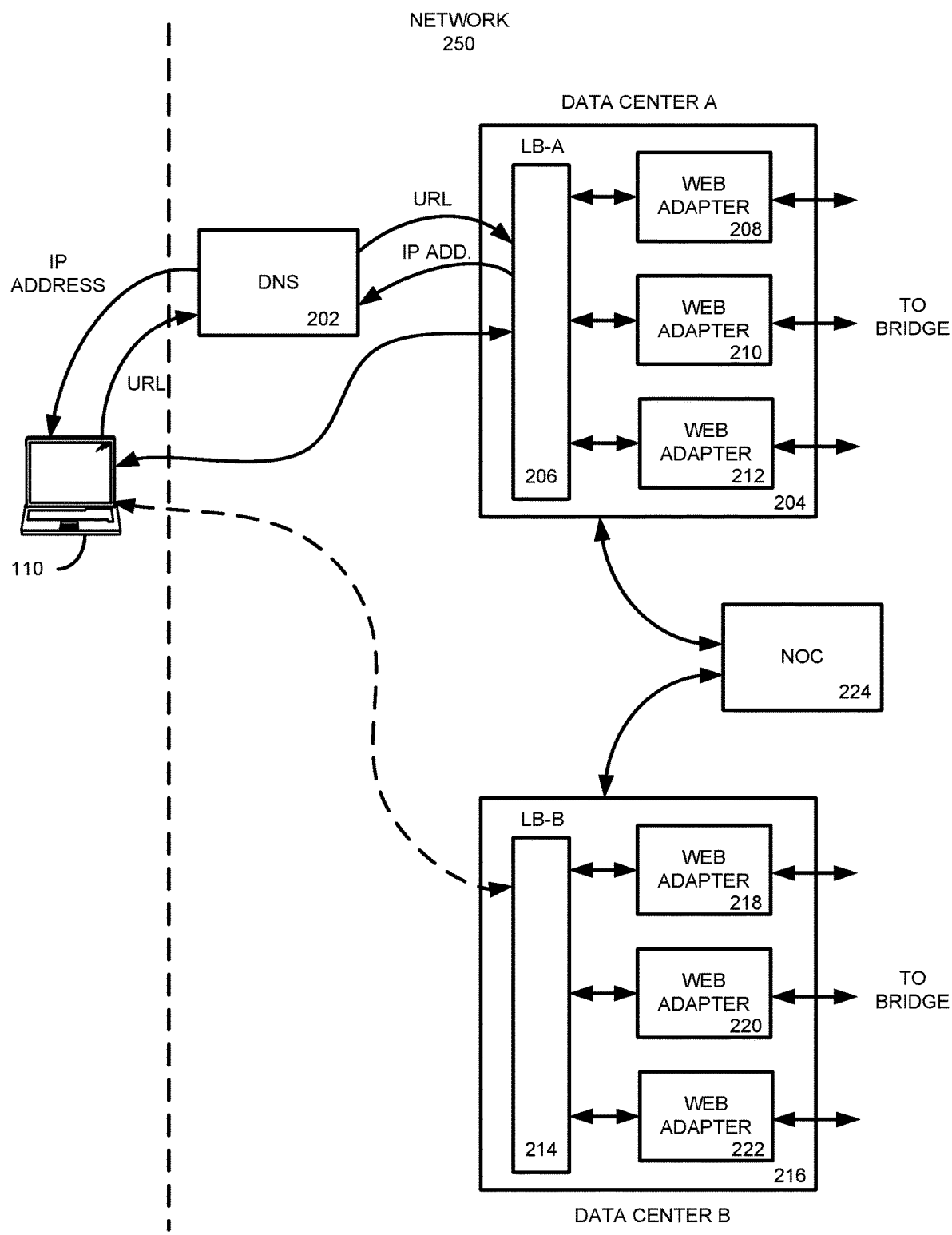
FIG. 2 is a schematic diagram illustrating a system for providing a failover procedure for a collaboration conference of a telecommunications network.

FIG. 2 is a schematic diagram illustrating a system 200 for providing a failover procedure for a collaboration conference of a telecommunications network. In the particular example shown, the failover system 200 illustrated is for collaboration conferences that include a portion of the conference on a first network (such as a data portion hosted on a data network) and a portion of the conference on a second network (such as a voice or audio portion on a voice network). In general, however, the system 200 and methods discussed herein may apply to any telecommunication service or network to provide a failover procedure for any component of the network.

The operation of the system 200 illustrated in FIG. 2 is similar to the collaboration conferencing systems described above in FIGS. 1A and 1B. For example, a participant utilizes a computing device 110 (such as a desktop or laptop computer) to access one or more telecommunications network to participate in a collaboration conference. In one embodiment, the network 250 provides the audio portion of collaboration conference to the participants of the conference. However, because a data portion of the conference may be hosted on a separate network, several web adapters 208-212 are provided within the network 250 to allow for control over the audio portion of the conference through a participant's computing device 110. The web adapters 208-212 allow for control of the audio portion either directly from a user's computing device 110 or from the second data network 155, as described above. The embodiment shown in FIG. 2 illustrates the web adapters 208-212 connecting the user's device 110 to a conferencing bridge. However, web adapters 208-212 may similarly connect a data network 155 to the conferencing bridge to manage portions of the collaboration conference.

In addition, the network 250 may include a number of geographically disparate data centers, two of which are illustrated in FIG. 2 as data center A 204 and data center B 216. It should be appreciated, however, that the network 250 may include any number of data centers located in any number of geographical locations. The data centers of the network 250 may provide redundancy features to the components and services of the network such that each data center may include similar components and configurations as other data centers of the network 250. Failure at any data center or component may be addressed through a redirection of traffic to backup data center or component. Each data center 204, 216 of the network 250 may include any number and type of networking components. The data centers 204, 216 provided in FIG. 2 are for illustration purposes only and are not intended to limit the number and configuration of the data centers of the network 250.

In addition to the data centers 204, 216 and other networking components, the network 250 may include or otherwise be in communication with an operations center 224 or control device. In general, the operations center 224 provides a control mechanism for an administrator or operator of the network 250 to configure the components and interconnectivity of the network. Thus, the operations center 224 may create service paths through the network, place network components in an online or offline state, reboot components, create communication paths, broadcast network IP addresses, and the like. In particular, administrators or devices within the NOC 224 may provide one or more instructions to components of the network to configure the network as desired, perhaps in response to an outage at one or components. The operations center 224 may include any number devices and operators to communicate with the various components of the network 250 to control the entire operation of the network in response to operational parameters and measurements obtained from the network.

As shown, data center A 204 of the system 250 includes three web adapters 208-212, although any number of such adapters may be included in or otherwise associated with the data center. As explained above, each web adapter 208-212 may process communications between the participant's computing device 110 and a conferencing bridge (not shown) of the telecommunications network on which an audio portion of a collaboration conference is being hosted. In another embodiment, the adapter 208-212 may process communications between a data network 150 hosting a data portion of the conference and the audio conferencing bridge. For example, the participant's device 110 may receive an instruction, perhaps through a browser program executing on the device, to disconnect a particular participant from the conference. The instruction is processed through one or more of the web adapters 208-212 and transmitted to the conferencing bridge for execution of the instruction. In this manner, the adapters 208-212 may act as participants themselves to the audio portion of the conference to interact with the conferencing bridge and control certain aspects of the audio portion of the collaboration conference.

To connect to a collaboration conference, a participant utilizes a computing device 110 to transmit a URL to a domain name server (DNS) 202 associated with the network 250. The URL is generally associated with the collaboration conference accessible through the participant's computing device 110. The DNS 202 is configured with a table of one or more IP addresses that is returned in response to receiving the URL request from the device 110. As explained in more detail below, the DNS 202 may include a primary IP address to return to the device 110 and one or more secondary IP addresses to return. The primary IP address is typically returned in response to the URL request, although a secondary IP address may be returned when certain operational conditions of the network 250 are present.

In another embodiment, the DNS 202 may be configured to access a delegation server that provides the IP address information for the particular received URL. For example, the DNS 202 transmits the received URL to the delegation server which is configured to provide the primary IP address when certain conditions of the network 250 are met or the secondary IP address when other conditions are met. Such conditions that cause the delegation server to provide a first IP address over a second IP address in response to the request are discussed in more detail below. In one particular embodiment, a load balancer (such as load balancer A 206) may be the delegation server for the DNS 202. Thus, the load balancer 206 may return its own IP address in response to a URL request from the DNS 202 if the load balancer is the primary IP address. Secondary IP addresses of other load balancers, such as load balancer B 214 at data center B 216, may also be returned in response to the URL request received from the DNS 202.

In some instances, the DNS 202 returns an IP address associated with a load balancer 206 at data center A 204 to the user device 110 in response to the received request. Thus, the load balancer 206 (or any other component or control center 224) provides the IP address of the load balancer to the DNS 202 in response to the request. In some instances, the DNS 202 may store the IP address for the load balancer 206 in a DNS table. The load balancer 206 or the operations center 224 may thus designate the IP address of the load balancer 206 as the primary IP address at the DNS 202 for the particular URL request. An IP address associated with load balancer B 214 of data center B 216 may similarly be provided to the DNS 202 for storage as a secondary IP address for the particular URL. In this manner, the operations center 224 or network 250 may determine a hierarchy of data centers 204, 216 to establish and control collaboration conferences for particular URLs or users of the network during outages or other operating conditions of the network.

Upon receiving the IP address of the load balancer 206 of data center A 204, the participant's device 110 connects to and begins communicating with the load balancer to exchange packets associated with a collaboration conference. The load balancer 206 is configured to receive communications for all or some of the adapter traffic at the data center 204 and balance the load across the adapters 208-212 at the site. For example, the load balancer 206 may connect the device 110 to a selected adapter 208 for communication between the device and the conferencing bridge. Another device accessing the network 250 to access a different collaboration conference may then be connected to a second adapter 210 by the load balancer 206. In this manner, the load balancer 206 may balance the load at the adapters for data center A 204 across the available adapter devices 208-212. In another example, rather than assigning one adapter to a requesting device, the load balancer 206 may spread the communications to and from the device 110 across multiple adapters 208, 212, even during the same collaboration conferencing session. Regardless of the process by which an adapter is selected for a collaboration conferencing communication, the load balancer 206 provides an interface between the participant's device 110 and one or more of the adapters 208-212 of data center A 204. In a similar manner, data center B 216 may include a load balancer 214 to receive communication from user devices and balance the load at the adapters 218-222 of the data center.

In some implementations, the load balancer 206 of a first data center 204 may utilize adapters 208-212 from the first data center and/or adapters 218-222 from a separate, second data center 216. To utilize adapters from various data centers, each adapter available for use by the load balancer 206 may join or otherwise be associated with a collaboration conference. Thus, utilizing the network environment 250 of FIG. 2, each adapter 208-212 of data center A 204 may be connected to a particular collaboration conference such that the load balancer 206 may send received communications through any of the adapters to the conferencing bridge of the collaboration. In a similar manner, one or more of the adapters 218-222 of data center B 216 may also be connected to the conferencing bridge of the collaboration for additional use in load balancing communications to the bridge. Thus, the adapters through which a load balancer 206 connects to a conferencing bridge may initiate a connection with the conferencing bridge, regardless of whether the adapter is active or inactive for that collaboration. The use of the connected adapters to the conferencing bridge to load balance and for a failover procedure is discussed in more detail below.

During operation of the network 250, the load balancer 206 of a data center 204 may determine if the adapters 208-212 of the data center are operational and/or determine a performance metric for the adapters. For example, the load balancer 206 and adapters 208-212 may exchange one or more messages that indicate an operating state of the adapters. This may allow the load balancer 206 to share the incoming traffic to the operational adapters within the data center 204. In some embodiments, adapters in other data centers may also be in communication with the load balancer 206 such that the load balancer may utilize those adapters in sharing the incoming traffic. For example, web adapters 218-222 of data center B 216 may be in communication with load balancer A 206 of data center A 204 such that the load balancer may consider the adapters in data center B when balancing incoming traffic once those adapters are connected to the collaboration conferencing bridge. Further, the adapters 218-222 of data center B 216 may provide operational messages to load balancer A 206 to indicate to the load balancer that the adapter is operating or to provide performance metrics of the adapter. For example, the adapters 208-212 may provide an estimated load at the particular adapter to the load balancer 206 for use by the load balancer is balancing load across the available adapters.

While any adapter within the network 250 may be included in the load balancing of incoming traffic to the adapters for any particular load balancer, such available adapters may be limited to those within the same data center as the load balancer in some instances. For example, although adapters 218-222 of data center B 216 may be available for balancing by the load balancer A 206 of data center A 204, load balancer A may be limited to utilizing those adapters 208-212 located in data center A 204 only during normal operation of the network 250. In one embodiment, this configuration of the network 250 may be initiated by the control system 224 in communication with the network. In particular, the control system 224 may activate adapters 208-212 or otherwise indicate those adapters are active for load balancer A 206. Adapters 218-222 of data center B 216 may be placed in an inactive state for load balancer A 206 (even though those adapters may be active for load balancer B 214 as they are in the same data center as load balancer B). By placing certain adapters in an inactive state for a particular load balancer, the control system 224 may limit the number and location of adapters used to process incoming communications related to the collaboration conference. Further, although adapters 218-222 may be inactive for load balancer A 206, the adapters may continue to provide load balancer A with an indication of the operational status of the adapters in case a failover procedure is needed.

In some instances, it may be desirable to utilize back-up adapters to process the collaboration conferencing communications received from a computing device 110. For example, one or more outages may occur at data center A 204 that prevents the adapters 208-212 from properly processing the incoming communications. In another example, data center A 204 may become overwhelmed with traffic due to an attack on the data center, slowing down the processing of incoming packets. In such circumstances, the adapters 218-222 of data center B 216 may provide failover protection for the adapters 208-212 of data center A 204. This failover procedure may occur when an outage is detected at one or more adapters of the system 200 or through an instruction provided by the control system 224 in response to an input received by a network administrator or operator. In general, any change in the operational status of system 200 may trigger the failover procedure.

Figure 3:
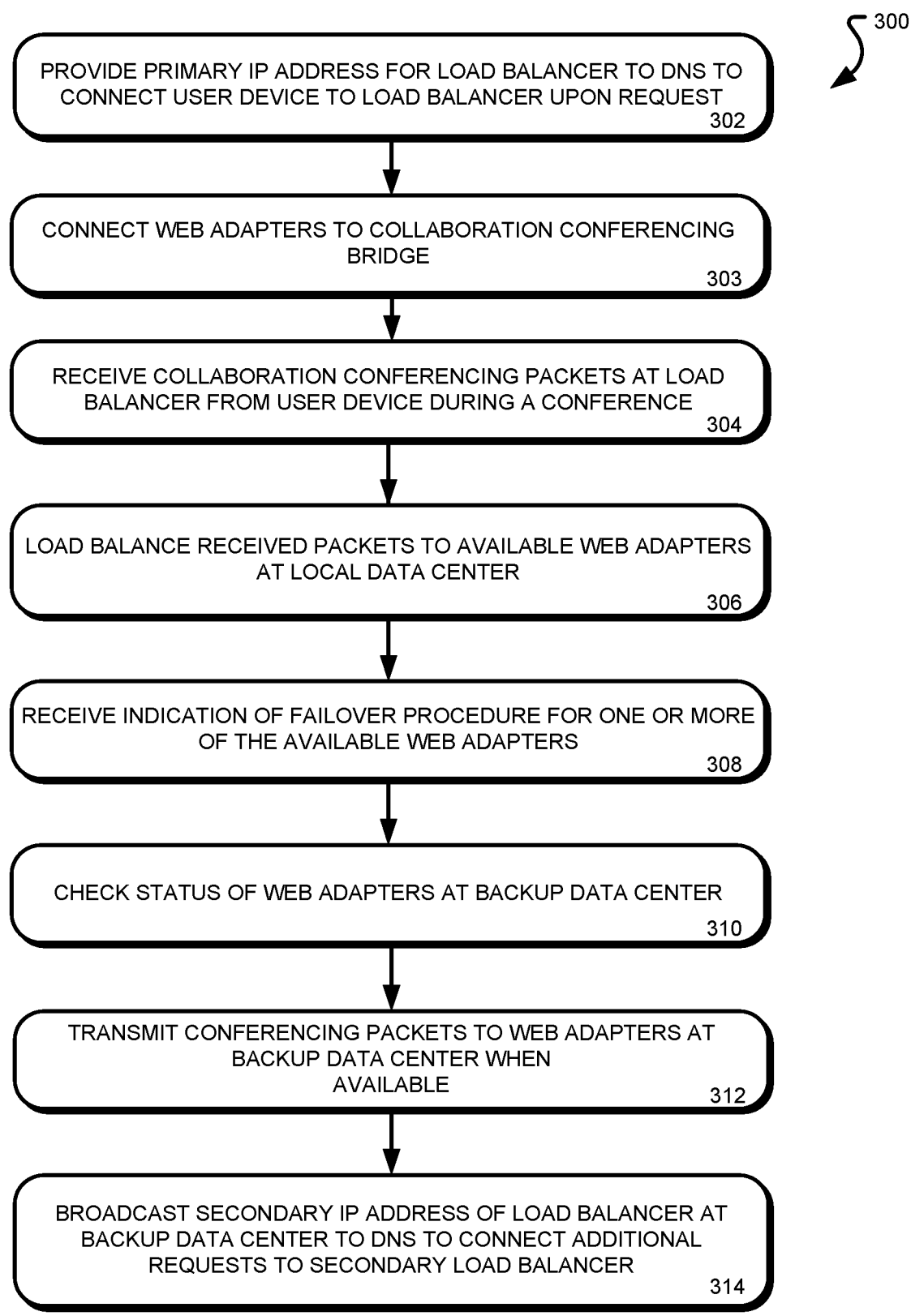
FIG. 3 is a flowchart of a method for a collaboration conferencing system to provide a failover procedure.

FIG. 3 is a flowchart of a method 300 for a collaboration conferencing system to provide a failover procedure for one or more adapters of the conferencing system. The operations of the method 300 may be performed by a load balancer component of the system 200 illustrated in FIG. 2, although any number and combination of components may perform the described operations. Further, although described with reference to the system 200 of FIG. 2, the operations may be applied to any network configuration that provides collaboration conferencing or other types of telecommunication services.

Beginning in operation 302, the load balancer 206 provides a primary IP address to a DNS 202 associated with the network 250. As explained above, the DNS 202 may provide a URL request to the load balancer 206 to which the load balancer responds with a primary IP address. A secondary IP address may also be provided. In another embodiment, the primary IP address for the primary load balancer 206 may be provided to the DNS 202 from another component of the network 250, such as the control system 224. Regardless of which component provides the information, the DNS 202 accesses a primary IP address for routing received communications to a load balancer 206 within the network 250 for processing communications between the collaboration conferencing system and a participant's computing device 110. Further, in operation 303, one or more web adapters are connected to the conferencing bridge associated with the collaboration conference to transmit and coordinate data and audio portions of the collaboration conference. In one particular implementation, the web adapters may be located in separate data centers of the telecommunications network.

In operation 304, the load balancer 206 receives a collaboration conference-related communication packet from the participant's computing device 110. The packet may include an instruction to control some aspect of an audio portion of the collaboration conference or may be any other instruction or information associated with an ongoing collaboration conference. The load balancer 206, in operation 306, selects an adapter 208 from the available adapters to process the received packet and transmits the packet to the selected adapter. As mentioned above, the selected adapter may be in the same data center 204 as the load balancer or may be located in a different data center 216. The adapter 208 upon receiving the packet may process the packet (such as translating the packet) and transmits the packet to the conferencing bridge hosting the audio portion of the collaboration conference. The operations of receiving packets from the computing device 110 and load balancing the received packets among the adapters 208-212 of the data center 204 may continue for any collaboration conference hosted by the network 250.

At some point, however, a failure or other change in operational state may occur at one or more of the adapters 208-212 or portions of the data center 204. In such an instance, the load balancer 206 may receive an indication of an initiation of a failover procedure in operation 308. This indication may occur when the load balancer 206 detects a failure or slowdown at one of the adapters 208 being utilized by the load balancer. In one example, the detection of the failure may be determined through a missing message from the adapter 208 to the load balancer 206 indicating that the adapter is still active. A missing "keep alive" message from the adapter 208 suggests that a failure has occurred at the adapter, potentially triggering the beginning of the failover procedure to a back-up data center 216.

In another example, the indication of the failover procedure may be received from the operations control center 224 at the load balancer 206. In particular, an operator or administrator of the network 250 may access a computing device within the control center 224 that provides a graphical user interface (GUI) through which the initiation of the failover procedure may be selected. Other operational controls of the components of the network 250 may also be presented to the device user in the control center 224, as described in more detail below with reference to FIG. 4.

Regardless of how the load balancer 206 receives the indication of the failover procedure, the load balancer may then begin to redirect collaboration conferencing traffic to a back-up data center 216 or back-up adapter through the operations below to ensure that interruptions to the services of the network 250 are minimized.

In operation 310, the load balancer 206 checks an operating status of one or more backup adapters. In one particular embodiment, the backup adapters 218-222 are located at a second data center 216 of the network 250. As mentioned above, the load balancer 206 may be in communication with web adapters 218-222 located in a data center 216 different than the data center 204 in which the load balancer is connected. Through the communication, the load balancer 206 may receive operating status indicators from the backup adapters 218-222. The operating status may provide an indication of any type of operating status of the adapter, such as whether the adapter is active, inactive, powered on, powered down, load estimate, or any other type of status indication. In some instances, the status of the backup adapters 218-222 may be set by the control center 224. In other words, the control center 224 may place the backup adapters 218-222 in the second data center 216 into an active state such that the adapters may begin to receive collaboration conferencing traffic from the load balancer 206 in the first data center 204.

Once the load balancer 206 determines that one or more of the backup adapters 218-222 in the second data center 216 are active, the load balancer may begin to provide received collaboration conferencing packets to the backup adapters in operation 312. Thus, the load balancer 206 of the first data center 204 may use the adapters 218-222 of the second data center 216 in a similar manner as the adapters 208-212 of the first data center to disperse the received collaboration conferencing packets among the adapters. In addition, the load balancer 206 may broadcast a secondary IP address to the DNS 202 in operation 314 to begin redirecting collaboration conferencing packets to the load balancer 214 of the second or backup data center 216 for particular conferences hosted by the inactive adapter. The secondary IP address broadcast by the load balancer A 206 may be associated with the load balancer B 214 of the second data center 216. The load balancer A 206 may provide the secondary IP address to the DNS 202 as the delegate server for the DNS. In another embodiment, the secondary IP address pointing to load balancer B 214 may be provided to the DNS 202 from the control center 224.

Through the method 300 of FIG. 3, collaboration conferencing traffic being processed through the web adapters 208-212 of data center A 204 may be rerouted to the adapters 218-222 of data center B 216. This failover to the backup data center 216 may occur in response to a detected failure at data center A 204 or in response to one or more instructions provided by the control center 224. In one embodiment, the instructions from the control center 224 may be initiated by a network administrator through a GUI executing on a computing device of the control center.

Figure 4:
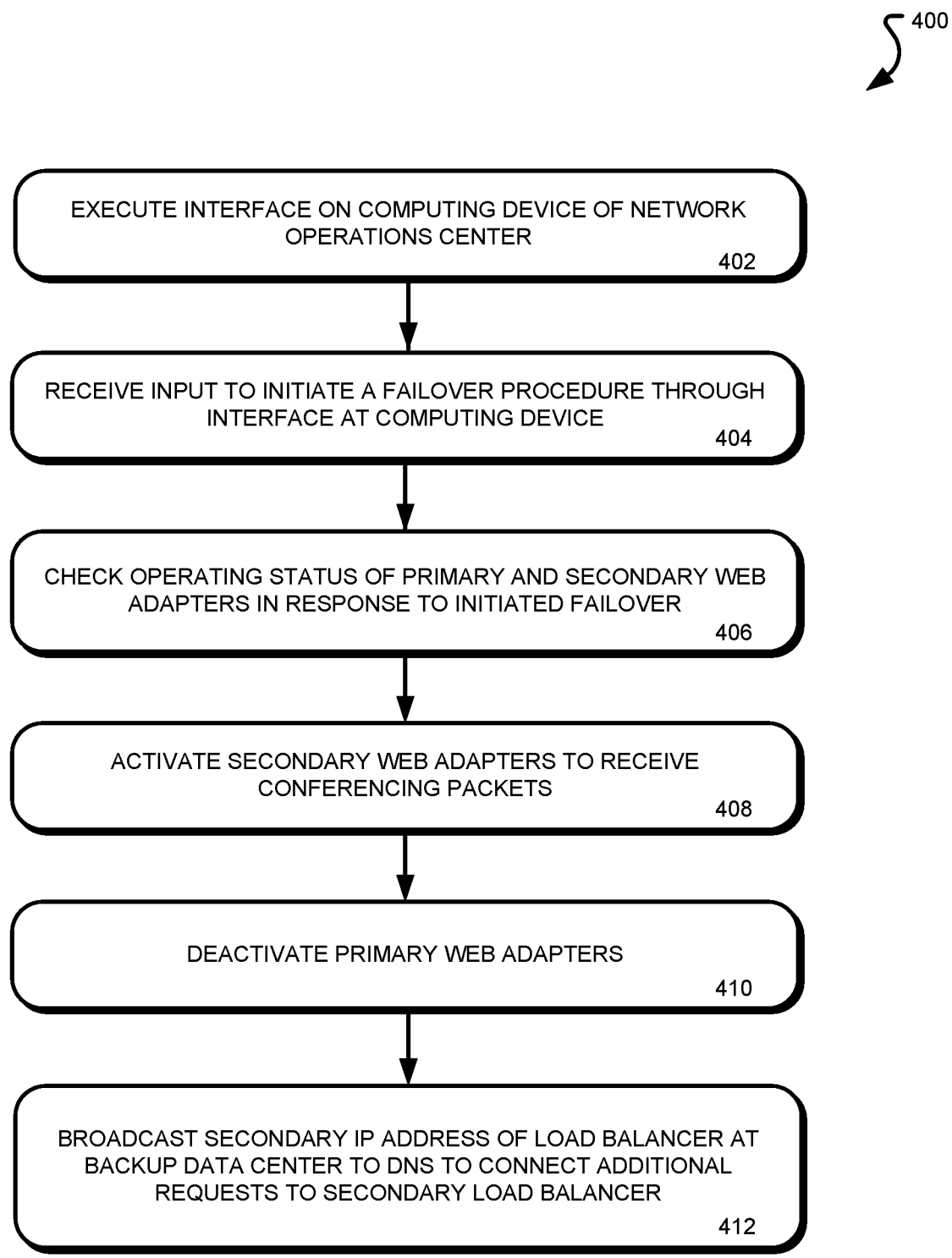
FIG. 4 is a flowchart of a method for a network operations system to initiate a changeover from one data center to another data center for a collaboration conferencing service.

FIG. 4 is a flowchart of a method for a network operations system to initiate a changeover from one data center to another data center for a collaboration conferencing service. The operations of the method 400 may be performed by any one or many computing devices associated with the network operations center 224 that communicate with the network 250. In particular, the computing device executes an interface on the device in operation 402 through which a user of the computing device, such as a network administrator or operator, may interact with and control aspects of the network 250. Through the interface, a user of the device provides an input to initiate a failover procedure of one or more web adapters associated with the network 250 in operation 404. The input may be received through any input device to the computing device, such as a mouse or keyboard.

Upon receiving the input, the computing device checks the operating status of the web adapters 208-212 of the primary data center 204 and the web adapters 218-222 of the secondary data center 216. In particular, the control center 224 may transmit one or more information request commands to the adapters 208-212 of the primary data center 204 and the adapters 218-222 of the secondary data center 216. Each adapter may provide, in turn, a response that includes an indication of the operating status of the adapters. With this information, the control center 224 may determine which adapters are active and which are inactive for processing collaboration conferencing communications from participants to one or more conferences hosted on the network 250. During a failover procedure from the primary adapters 208-212 to the secondary adapters 218-222, the control center 224 may activate the secondary adapters in operation 408. With the secondary adapters 218-222 now active, collaboration conferencing traffic may now be processed by the secondary adapters in the secondary data center 216. Further, the control center 224 may place the primary adapters 208-212 in data center A 204 into an inactive state in operation 410. Through these operations, the load balancer 206 of the data center A 204 may begin to transmit collaboration conferencing packets to the secondary or backup adapters 218-222 at the second data center 216. Further, in some embodiments, the control center 224 transmits a secondary IP address (such as an IP address associated with the load balancer 214 of the secondary data center 216) to a DNS 202 in operation 412 to begin directing collaboration conferencing traffic to the secondary data center from the first data center 204. Through the method 400, a control center 224 of a telecommunications network 250 may failover collaboration conferencing traffic from a first web adapter in a first data center to a second web adapter in a second data center.

Figure 5:
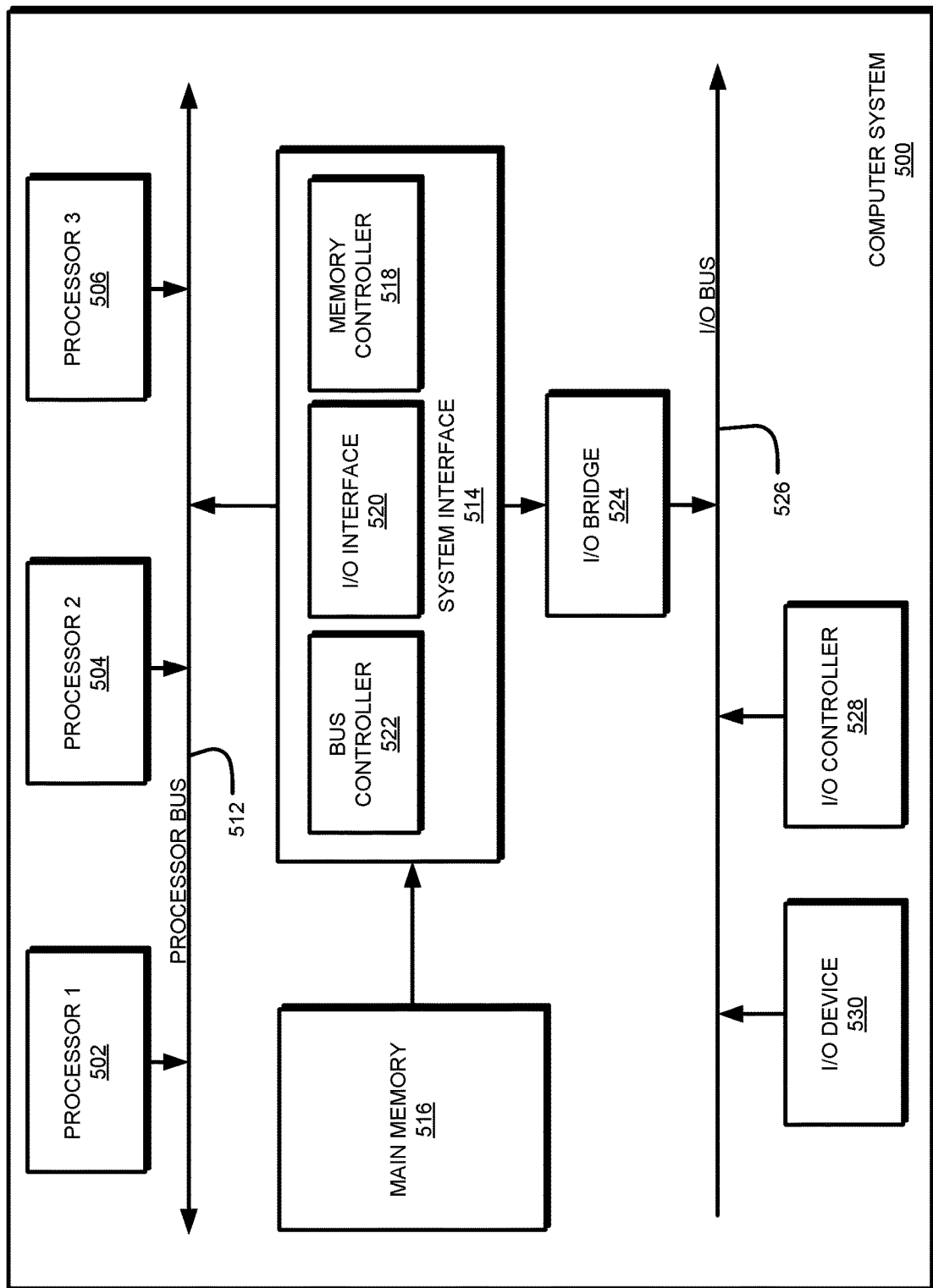
FIG. 5 is a diagram illustrating an example of a computing system which may be used in implementing embodiments of the present disclosure.

FIG. 5 is a block diagram illustrating an example of a computing device or computer system 500 which may be used in implementing embodiments of the present invention. For example, the computer system 500 may be one of the load balancers or adapters of the networks described above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. Processors 502-506 may also be purpose built for processing/mixing media data, such as audio or video components of a media stream, such as a digital switch processor. System interface 514 may be connected to the processor bus 512 to interface other components of the system 500 with the processor bus 512. For example, system interface 514 may include a memory controller 516 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for operating a telecommunications network comprising:
    associating a first load balancer and a first web adapter device of a first data center with a second web adapter device of a second data center with a collaboration conferencing bridge of a telecommunications network, each of the first web adapter device and the second web adapter device configured to receive a communication associated with a data portion of a collaboration conference comprising the data portion and an audio portion hosted on the collaboration conferencing bridge, wherein the first data center is different than the second data center;
    transmitting a primary Internet Protocol (IP) address associated with the first load balancer of the first data center in response to a domain name request for connection to the collaboration conferencing bridge;
    receiving, by the first load balancer, an indication of an initiation of a failover procedure for the first web adapter device;
    transmitting, by the first load balancer, one or more status requests to the second web adapter device of the second data center;
    receiving, by the first load balancer, an operating status indicator from the second web adapter device of the second data center in response to the one or more status requests; and
    redirecting, by the first load balancer, an additional communication associated with the data portion of the collaboration conference hosted on the collaboration conferencing bridge to the second web adapter device of the second data center.

2. The method of claim 1 wherein the indication of the initiation of the failover procedure comprises a failover instruction from a control center of the telecommunications network.

3. The method of claim 1 wherein the indication of the initiation of the failover procedure comprises a failure notification of the at least one first web adapter device of the first data center.

4. The method of claim 1 wherein the first data center is geographically separate from the second data center.

5. The method of claim 1 further comprising: transmitting, after receiving the indication of the initiation of the failover procedure, a secondary IP address associated with a second load balancer of the second data center in response to a domain name request for connection to the collaboration conferencing bridge, the secondary IP address different than the primary IP address.

6. The method of claim 1 wherein the operating status indicator from the second web adapter of the second data center indicates an active operating status.

7. The method of claim 1 further comprising:
    balancing, by the first load balancer, collaboration conferencing communications between the first web adapter device of the first data center and the second web adapter device of the second data center.

* * * * *